(12) United States Patent
Shiga et al.

(10) Patent No.: US 8,793,851 B2
(45) Date of Patent: Aug. 5, 2014

(54) RETAINER ASSEMBLING APPARATUS AND RETAINER ASSEMBLING METHOD

(75) Inventors: Hiroyuki Shiga, Shinagawa-ku (JP); Kotaro Takamura, Shinagawa-ku (JP); Yukihiro Kawamoto, Shinagawa-ku (JP); Masahiro Koizumi, Shinagawa-ku (JP); Haruo Oka, Shinagawa-ku (JP); Koji Matsuda, Shinagawa-ku (JP)

(73) Assignee: Hirata Corporation, Shinagawa-Ku, Tokyo (JP)

( * ) Notice: Subject to any disclaimer, the term of this patent is extended or adjusted under 35 U.S.C. 154(b) by 46 days.

(21) Appl. No.: 13/469,445

(22) Filed: May 11, 2012

(65) Prior Publication Data

US 2012/0285015 A1 Nov. 15, 2012

(30) Foreign Application Priority Data

May 13, 2011 (JP) ................................. 2011-108702

(51) Int. Cl.
*B23P 19/04* (2006.01)
(52) U.S. Cl.
USPC .................................. 29/249; 29/795; 29/214
(58) Field of Classification Search
USPC ................. 29/888.46, 888.45, 888.4–888.41, 29/888.06, 888.01, 890.123–890.125, 29/890.12, 795, 214, 213.1, 249, 247
See application file for complete search history.

(56) References Cited

U.S. PATENT DOCUMENTS

| 2,586,756 | A | * | 2/1952 | Wolfe et al. | .................... 29/213.1 |
| 5,915,740 | A | * | 6/1999 | Weitner | ......................... 29/213.1 |
| 6,684,492 | B2 | * | 2/2004 | Tachibana et al. | .............. 29/799 |
| 2003/0200641 | A1 | | 10/2003 | Tachibana et al. | |
| 2011/0023277 | A1 | | 2/2011 | Takagi et al. | |

FOREIGN PATENT DOCUMENTS

| EP | 1 338 373 A1 | 8/2003 | |
| JP | 10-61420 A | 3/1998 | |
| JP | 4033703 B2 | 1/2008 | |
| JP | 2009-125847 A | * 6/2009 | ............. B23P 21/00 |
| KR | 10-0536951 B1 | 8/2005 | |
| KR | 10-2007-0068708 A | 7/2007 | |

OTHER PUBLICATIONS

JPO machine translation of JP 2009-125847 A.*
Extended European Search Report dated Jul. 10, 2012, issued by the European Patent Office in the corresponding European Application No. 12166448.6. (7 pages).
Notice of Allowance dated Oct. 31, 2013 issued by the Korean Patent Office in the corresponding Korean Patent Application No. 10-2012-0048521.
Office Action dated Jun. 28, 2013 issued by the Korean Patent Office in the corresponding Korean Patent Application No. 10-2012-0048521.

* cited by examiner

*Primary Examiner* — Alexander P Taousakis
*Assistant Examiner* — Matthew P Travers
(74) *Attorney, Agent, or Firm* — Buchanan Ingersoll & Rooney PC

(57) ABSTRACT

This invention provides a retainer assembling apparatus which assembles a retainer to a valve stem via a cotter which engage with an engaging groove formed on the valve stem. The cotter comprises a pair of cotter segments. The apparatus includes a cylindrical body, a holding portion which holds the retainer contacting a lower end of the cylindrical body, a push-up shaft which pushes up the pair of cotter segments into the cylindrical body, and an axial body which is arranged in the cylindrical body to be coaxial with the push-up shaft and to be coaxially movable. The cylindrical body includes a tapered inner circumferential portion on an inner circumferential wall lower portion thereof.

4 Claims, 8 Drawing Sheets

RETAINER ASSEMBLING APPARATUS AND RETAINER ASSEMBLING METHOD

BACKGROUND OF THE INVENTION

1. Field of the Invention

The present invention relates to an assembling technique of a retainer to a valve stem of an intake valve or exhaust valve of an engine.

2. Description of the Related Art

A retainer is attached to a valve stem via a cotter. The cotter is a member which engages with an engaging groove formed on the valve stem, and includes a pair of cotter segments. In general, in an apparatus for assembling a retainer to which a cotter has already been assembled to a valve stem, cotter segments are pushed up from the retainer to open the cotter segments, and a valve stem is inserted between the cotter segments. Then, the cotter segments are engaged with an engaging groove of the valve stem, and are then returned to the retainer, thereby assembling the retainer to the valve stem (for example, Japanese Patent Laid-Open No. 10-61420 and Japanese Patent No. 4033703).

Upon pushing up the cotter segments from the retainer, when the cotter segments turn over or when the pair of cotter segments have nonuniform postures, this results in an engagement failure between the engaging groove of the valve stem and the cotter segments.

In an apparatus of Japanese Patent Laid-Open No. 10-61420, only a retainer hole supports the pushed-up cotter segments, and the cotter segments unwantedly have unstable postures. In an apparatus of Japanese Patent No. 4033703, a holding mechanism which holds the cotter segments is arranged to be able to stabilize the postures of the cotter segments, but the apparatus arrangement is complicated.

SUMMARY OF THE INVENTION

An object of the present invention is to stabilize postures of cotter segments and to prevent any engagement failure with a valve stem by a simpler arrangement.

According to the present invention, there is provided a retainer assembling apparatus which assembles a retainer to a valve stem via a cotter which engages with an engaging groove formed on the valve stem, the cotter comprising a pair of cotter segments, the apparatus comprising: a cylindrical body including a lower end which the retainer attached with the cotter is brought into contact with, the cylindrical body allowing the valve stem to enter from the lower end; a holding portion which holds the retainer contacting the lower end of the cylindrical body; a push-up shaft which enters from a lower end of the retainer held by the holding portion and pushes up the pair of cotter segments into the cylindrical body; and an axial body which is arranged in the cylindrical body to be coaxial with the push-up shaft and to be coaxially movable, wherein the cylindrical body includes a tapered inner circumferential portion which is formed into a tapered shape, a diameter of which is increased upward, on an inner circumferential wall lower portion thereof.

According to the present invention, there is provided a retainer assembling method for assembling a retainer to a valve stem via a cotter which engages with an engaging groove formed on the valve stem, the cotter comprising a pair of cotter segments, the method comprising: a holding step of holding the retainer in a state in which the retainer attached with the cotter is brought into contact with a lower end of a cylindrical body, from the lower end of which the valve stem is inserted; a guiding step of pushing up the pair of cotter segments by causing a push-up shaft to enter from a lower end of the retainer held by the lower end, and causing the pair of cotter segments to enter into the cylindrical body in a separated state in which upper portions of the pair of cotter segments are separated to be larger than lower portions, while guiding the pair of cotter segments along a tapered inner circumferential portion, which is formed on an inner circumferential wall lower portion of the cylindrical body into a tapered shape, a diameter of which is increased upward; and a separation maintaining step of moving an axial body which is arranged in the cylindrical body to be coaxial with the push-up shaft and to be coaxially movable while moving the push-up shaft downward, and causing the axial body to enter in between the pair of cotter segments in the separated state to maintain the separated state.

Further features of the present invention will become apparent from the following description of exemplary embodiments (with reference to the attached drawings).

DESCRIPTION OF THE EMBODIMENTS

<System Arrangement>

Figure 1:
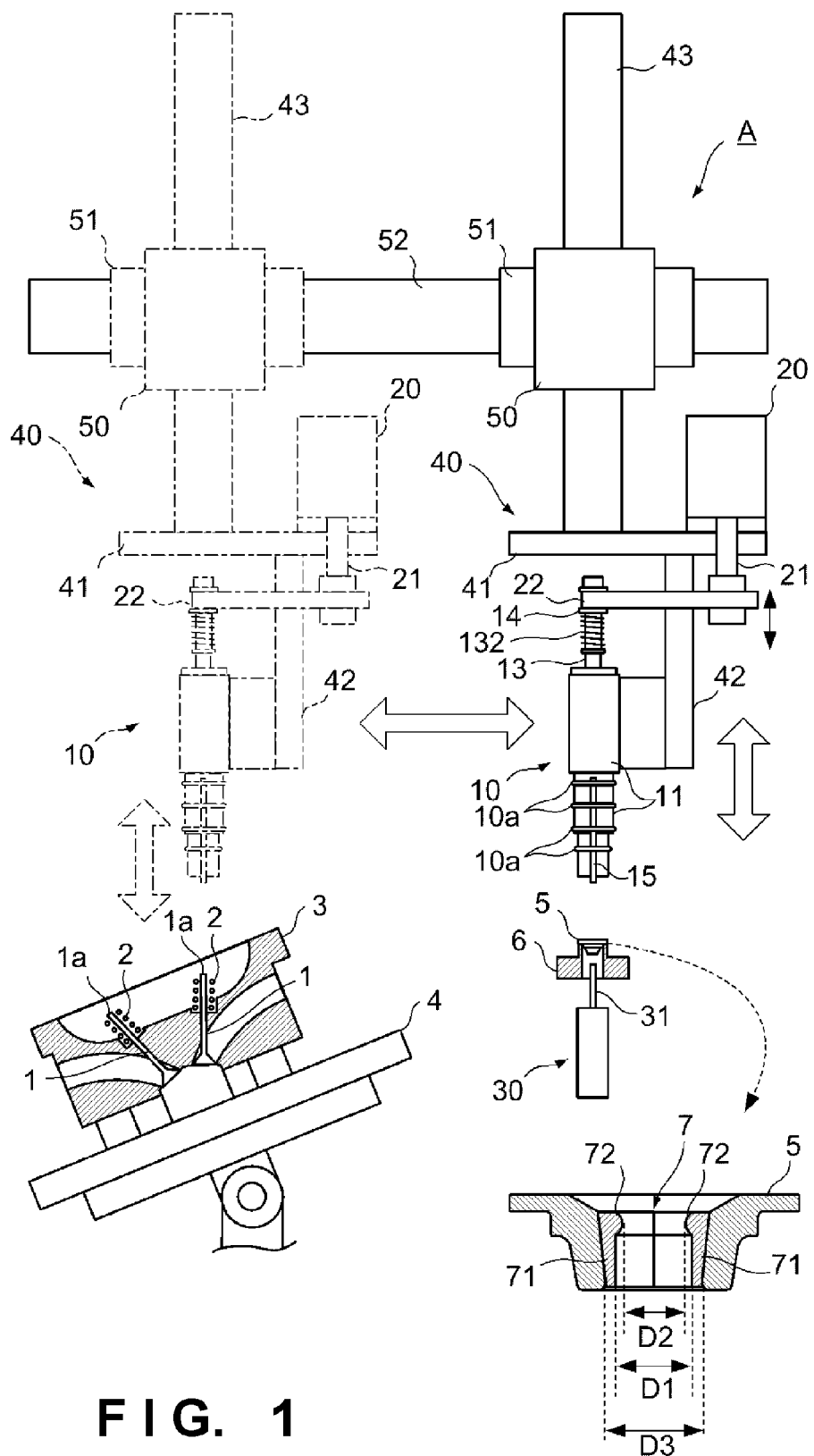
FIG. 1 is an explanatory view of a system using a retainer assembling apparatus according to one embodiment of the present invention.

FIG. 1 is an explanatory view of a system using a retainer assembling apparatus A according to one embodiment of the present invention. The retainer assembling apparatus A holds a retainer 5 which is prepared when it is placed on a support member 6, and automatically assembles the retainer 5 to a valve stem 1a of a valve 1 assembled to a cylinder head 3 on a pallet 4.

As shown in an enlarged sectional view of FIG. 1, the retainer 5 is a cylindrical body having a through hole in which the cotter 7 is inserted, and has a flange portion which contacts an end portion of a valve spring 2 on an upper portion thereof. The through hole in which the cotter 7 is inserted is a tapered hole whose diameter is gradually increased from a lower portion toward an upper portion thereof. In this embodiment, this tapered hole has a steepest degree of an increase in diameter on an uppermost portion. A minimum diameter of the through hole is D3.

The cotter 7 is a cylindrical body having a hole through which the valve stem 1a is inserted, and an inner circumference of the hole is formed with semi-spherical engaging portions 72, which engage with an engaging groove (an engaging groove 1b in FIG. 6 and the like) formed on the valve stem 1a. A diameter of the hole of the cotter 7 is D1, but a diameter at the positions of the engaging portions 72 is D2 (<D1).

An outer circumference of the cotter 7 has a tapered shape to fit the shape of the inner circumferential wall of the through hole of the retainer 5. For this reason, the cotter 7 can be inserted/removed upward with respect to the retainer 5 but it cannot be inserted/removed downward. The cotter 7 is formed of a pair of cotter segments 71 obtained by dividing the cotter 7 into halves. The retainer 5 is mounted to the valve stem 1a via this cotter 7, as is well known. That is, the cotter 7 is mounted to the valve stem 1a, so that the cotter segments 71 clip the engaging groove 1b. Then, the cotter 7 is inserted into the through hole of the retainer 5, thereby assembling the retainer 5 to the valve stem 1a.

The retainer 5 is sequentially supplied onto the support member 6 by a convey mechanism (not shown) while the cotter 7 is mounted. The valve 1 is supplied to a predetermined work position together with the pallet 4 while being assembled to the cylinder head 3 together with the valve spring 2. The posture of the cylinder head 3 is adjusted, so that the axial direction of the valve 1 agrees with a vertical direction.

<Retainer Assembling Apparatus A>

The retainer assembling apparatus A includes a holding unit 10, a driving unit 20, a support member 40 which supports these units, a lifting unit 50 which moves the support member 40 up and down, a moving unit 51 which moves the lifting unit 50, and a lifting unit 30 which is placed below the support member 6 and moves a push-up shaft 31 up and down.

The support member 40 includes an L-shaped member 42 connected to a cylindrical body 11 of the holding unit 10, a planar member 41 which supports the member 42 and the driving unit 20, and a rod-shaped member 43 which suspends the member 41 and extends in a vertical direction.

The rod-shaped member 43 is supported by the lifting unit 50 to be movable up and down, and the lifting unit 50 moves the holding unit 10, driving unit 20, and support member 40 up and down together. The lifting unit 50 includes a driving mechanism (not shown) which moves the rod-shaped member 43 up and down. As this driving mechanism, for example, a combination of a driving source such as a motor and a mechanism such as a rack-and-pinion mechanism may be used.

The lifting unit 50 is supported by the moving unit 51. The moving unit 51 moves in a horizontal direction while being guided along a rail member 52. The moving unit 51 includes a driving mechanism for the horizontal movement. As this driving mechanism, for example, a combination of a driving source such as a motor and a mechanism such as a ball screw mechanism may be used.

The moving unit 51 moves all of the holding unit 10, driving unit 20, support member 40, and lifting unit 50 in the horizontal direction along the rail member 52. Especially, the moving unit 51 moves the holding unit 10 between a position above the push-up shaft 31 indicated by the solid lines in FIG. 1 and a position above the valve stem 1a indicated by the one-dashed chain lines in FIG. 1.

The driving unit 20 is an actuator which moves a plunger 21 up and down, and is, for example, an electric cylinder or fluid cylinder. The plunger 21 is coupled to a tapping member 13 (to be described later) of the holding unit 10 via an arm member 22. When the plunger 21 is moved by the driving unit 20, it can move the tapping member 13 up and down.

The lifting unit 30 is an actuator, which moves the push-up shaft 31 up and down. The push-up shaft 31 is a solid shaft whose axial direction agrees with a vertical direction, and its diameter is larger than the aforementioned diameter D1 and is less than the diameter D3. The lifting unit 30 is, for example, an electric cylinder or fluid cylinder.

<Holding Unit 10>

Figure 2:
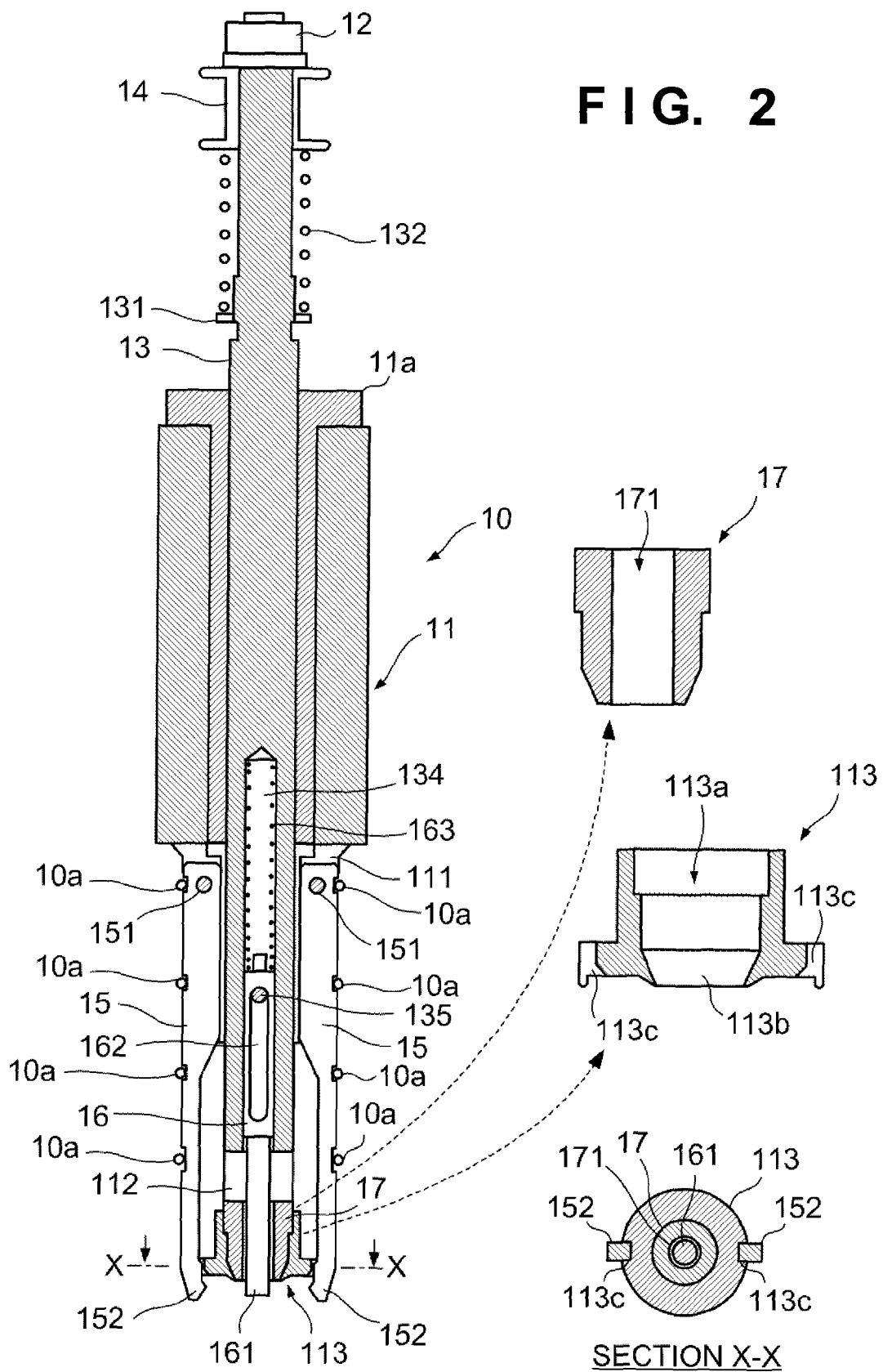
FIG. 2 includes a sectional view and partially enlarged views of a holding unit.

The holding unit 10 will be described below with reference to FIGS. 1 and 2. FIG. 2 includes a sectional view and partially enlarged views of the holding unit 10. The holding unit 10 includes a cylindrical body 11 which forms its housing. The cylindrical body 11 internally has a through hole 112 which extends in a vertical direction and has a circular section. This through hole 112 forms a guide hole of the tapping member 13 on its upper portion, and forms an entry space of the valve stem 1a, push-up shaft 31, or cotter 7 on its lower portion.

In this embodiment, an upper portion of the cylindrical body 11 is configured by two members, and has an independent cylindrical body 11a, but they may be integrated. The cylindrical body 11a forms an upper portion (guide hole of the tapping member 13) of the through hole 112.

A lower portion of the cylindrical body 11 is also configured by two members, and includes an independent guide member 113, but they may be integrated. The guide member 113 forms a lower end of the cylindrical body 11, and has a through hole 113a coaxial with the through hole 112. The through hole 113a has, on its inner circumferential lower portion, a tapered inner circumferential portion 113b which is formed in a tapered shape whose diameter is increased upward.

The guide member 113 is formed in a flange shape so that its lower portion protrudes in the radial direction, and is formed with slits 113c in which holding members 15 (to be described later) are inserted. The slits 113c are disposed at opposing positions (to have a 180° difference in the circumferential direction).

A lower end face edge portion of the guide member 113 is circular and flat so as to allow the upper surface of the retainer 5 to contact. A lower end face central portion protrudes downward while being slanted toward the center. Thus, the retainer 5 which contacts the lower end face of the guide member 113 can be coaxially aligned.

The lower side portion of the cylindrical body 11 is formed with slits 111. The slits 111 are disposed at opposing positions (to have a 180° difference in the circumferential direction). In the slits 111, the holding members 15 are inserted. Lower portions of the holding members 15 are formed as claw-like holding portions 152. The holding portions 152 hold the retainer 5 which contacts the guide member 113 that forms the lower end of the cylindrical body 11, as will be described later.

Upper portions of the holding members 15 are pivotally supported by the cylindrical body 11 via shafts (pins) 151. The two holding members 15 are opened/closed about the pins 151. FIG. 2 shows a case in which the holding members 15 are located at a closed position at which the holding portions 152 hold the retainer 5. When the holding portions 152 pivot in a direction to be separated away from the guide member 113, the two holding members 15 are opened, thus releasing the retainer 5. On a lower portion of the holding unit 10, a plurality of ring-shaped elastic members 10a are fit on the outer circumference of the holding members 15, and always bias the holding members 15 to the closed position. In this embodiment, by arranging the holding members 15 to be freely pivotal, opening/closing operations for holding and releasing the retainer 5 are attained. However, various other arrangements may be adopted. For example, the holding portions 152 may be formed of elastic members so as to hold and release the retainer by their elastic deformations.

The tapping member 13 is a cylindrical body which has an insertion hole 134 having a closed upper end on its lower portion, and has a solid upper portion. The tapping member 13 is movable to be coaxial with the through hole 112 while being guided by the through hole 112 of the cylindrical body 11.

A cylindrical bracket 14 is arranged to receive an upper portion of the circumferential surface of the tapping member 13. The bracket 14 is movable along the axial direction of the tapping member 13, and is connected to the arm member 22. To an uppermost portion of the tapping member 13, a stopper 12 which prevents the bracket 14 from being dropped is fixed.

A receiving member 131 is fixed at a position separated from the bracket 14 of the tapping member 13 by a predetermined distance. An elastic member 132 is mounted between the receiving member 131 and bracket 14. In this embodiment, the elastic member 132 is a coil spring. When the arm member 22 is moved downward upon operation of the driving unit 20, the bracket 14 is also moved downward, thereby applying a downward moving force to the tapping member 13 via the elastic member 132. As a result, the tapping member 13 can be moved downward.

When the arm member 22 is moved upward upon operation of the driving unit 20, the bracket 14 is also moved upward, and interferes with the stopper 12, thus applying an upward moving force to the tapping member 13. As a result, the tapping member 13 can be moved upward. As described above, according to this embodiment, in addition to the upward/downward movements of the entire holding unit 10 by the lifting unit 50, the tapping member 13 alone can be moved up and down. In this embodiment, the elastic member 132 is arranged as a shock absorber, but an arrangement in which the arm member 22 and tapping member 13 are fixed can also be adopted.

The tapping member 13 is the cylindrical body which has the insertion hole 134 having a closed upper end on its lower portion, and has a solid upper portion. The tapping member 13 is movable to be coaxial with the through hole 112 while being guided by the through hole 112 of the cylindrical body 11.

The insertion hole 134 is formed to be coaxial with the through hole 112, and an axial body 16 is coaxially inserted here to be movable in the axial direction. When the holding unit 10 is located at the position above the push-up shaft 31 (the solid line position in FIG. 1), the axial body 16 is coaxially positioned.

The axial body 16 has an elongated hole 162, which extends through in the radial direction, on its upper portion. In the elongated hole 162, a shaft (pin) 135 fixed to the tapping member 13 is inserted to regulate a moving range of the axial body 16. A lower portion of the axial body 16 is a solid axial portion 161, and its diameter is larger than the aforementioned diameter D2 and is smaller than the diameter D1.

An elastic member 163 is arranged between the closed upper end (top portion) of the insertion hole 134 and axial body 16. In this embodiment, the elastic member 163 is a coil spring, which always biases the axial body 16 downward in its axial direction.

A contact member 17 is arranged between the lower end of the tapping member 13 and the guide member 113. The contact member 17 is a cylindrical body having a through hole 171, through which the axial portion 161 of the axial body 16 is inserted. In this way, the contact member 17 is mounted around the axial portion 161 of the axial body 16, and is housed in the through hole 112 to be movable in the axial direction of the axial body 16. An outer shape of the contact member 17 is formed to fit an inner circumferential shape of the through hole 113a of the guide member 113, and its lower portion has a tapered shape, a diameter of which is decreased toward the lower end to fit the tapered inner circumferential portion 113b of the guide member 113.

<Assembling Operation>

The assembling sequence of the retainer 5 to the valve stem 1a by the retainer assembling apparatus A will be described below with reference to FIGS. 3 to 8. Giving an outline, the assembling sequence includes a holding process of the retainer 5 by the holding unit 10, a pushing-up process of the cotter 7 into the cylindrical body 11, and a mounting process of the retainer 5 to the valve stem 1a. Hence, as shown in FIG. 1, the holding unit 10 is moved by the moving unit 51 to the position (solid line position in FIG. 1) above the push-up shaft 31.

Figure 3:
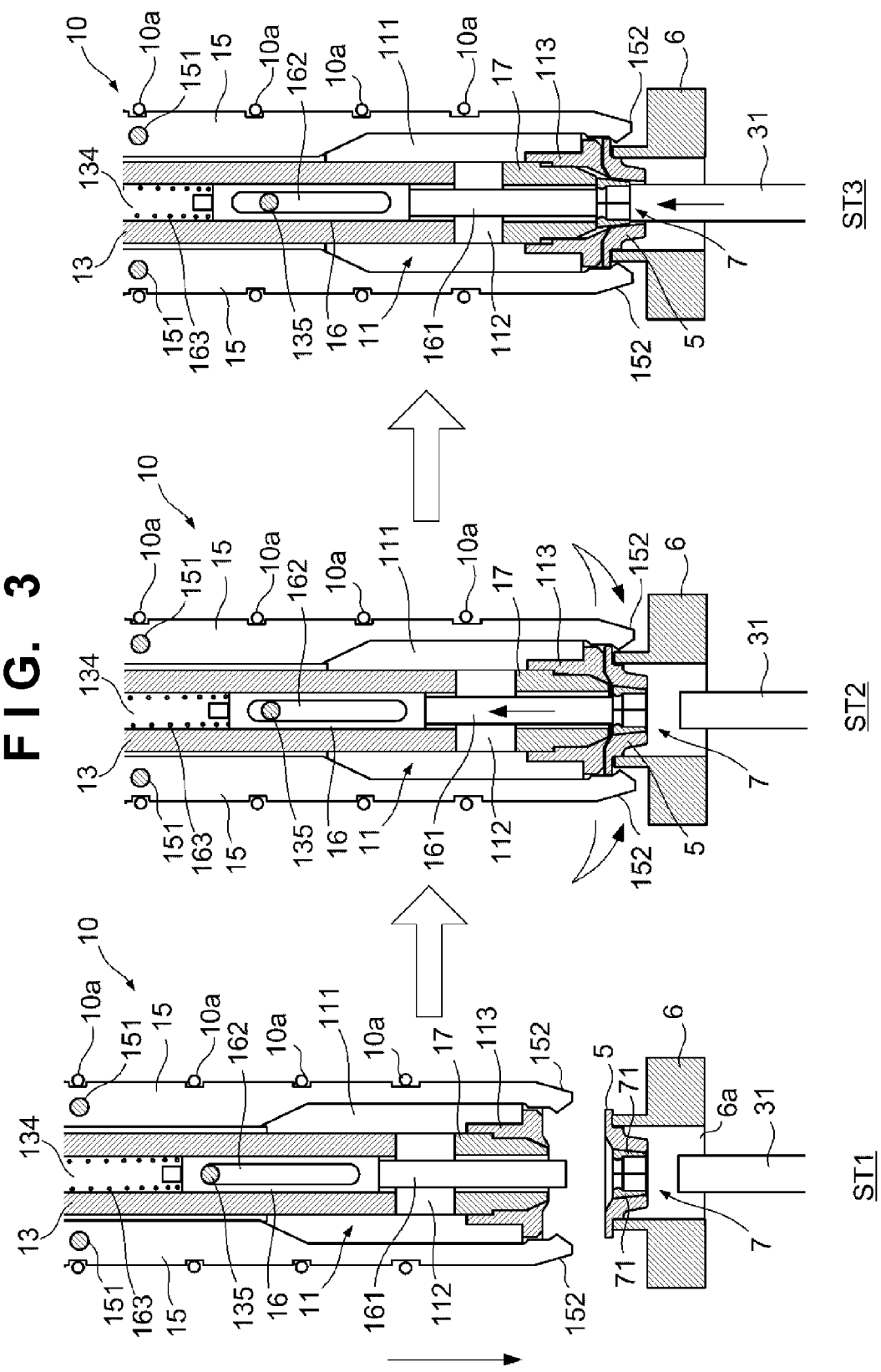
FIG. 3 includes operation explanatory views of the retainer assembling apparatus.

A state ST1 in FIG. 3 illustrates the positional relationship among the holding unit 10, the retainer 5 on the support member 6, and the push-up shaft 31 at this time. The push-up shaft 31, retainer 5, axial body 16, tapping member 13, through hole 112, and the like are located to be coaxial with each other (on an axis in the vertical direction).

Next, the holding unit 10 is moved downward upon operation of the lifting unit 50 to hold the retainer 5 on the support member 6 (holding process). A state ST2 in FIG. 3 shows a state in which the retainer 5 is held. When the holding unit 10 is moved downward, the retainer 5 contacts the lower end of the guide member 113 which forms the lower end of the cylindrical body 11. During this process, the holding portions 152 of the holding members 15 contact the flange portion of the retainer 5 to receive a reaction force on the opening side. As a result, the holding members 15 slightly pivot in an opening direction against the biasing force of the elastic members 10a.

Inner surfaces of the holding portions 152 project to form convex portions. When the flange portion of the retainer 5 climbs over these convex portions as the holding unit 10 is moved downward, the holding members 15 pivot in the opening direction and are then returned to a closed position (see arrows in the state ST2), and the retainer 5 is held between the holding members 15 while contacting the lower end of the guide member 113. Note that in this embodiment, the retainer 5 is held by moving the holding unit 10. Alternatively, the retainer 5 may be moved.

Next, the cotter 7 is pushed up into the cylindrical body 11. For this purpose, the lifting unit 30 is driven to move the push-up shaft 31 upward (guide process). The push-up shaft 31 enters into the retainer 5 from the lower end of the retainer 5, and begins to push up the cotter 7 into the cylindrical body 11 (state ST3 in FIG. 3). As the pushing-up action of the push-up shaft 31 progresses, the cotter 7 are pushed up into the through hole 113a of the guide member 113, as shown in a state ST4 in FIG. 4. At this time, since the contact member 17 contacts the cotter 7 from a position above the cotter 7, and the axial portion 161 also contacts the push-up shaft 31, both the contact member 17 and axial portion 161 are also pushed up.

Figure 5:
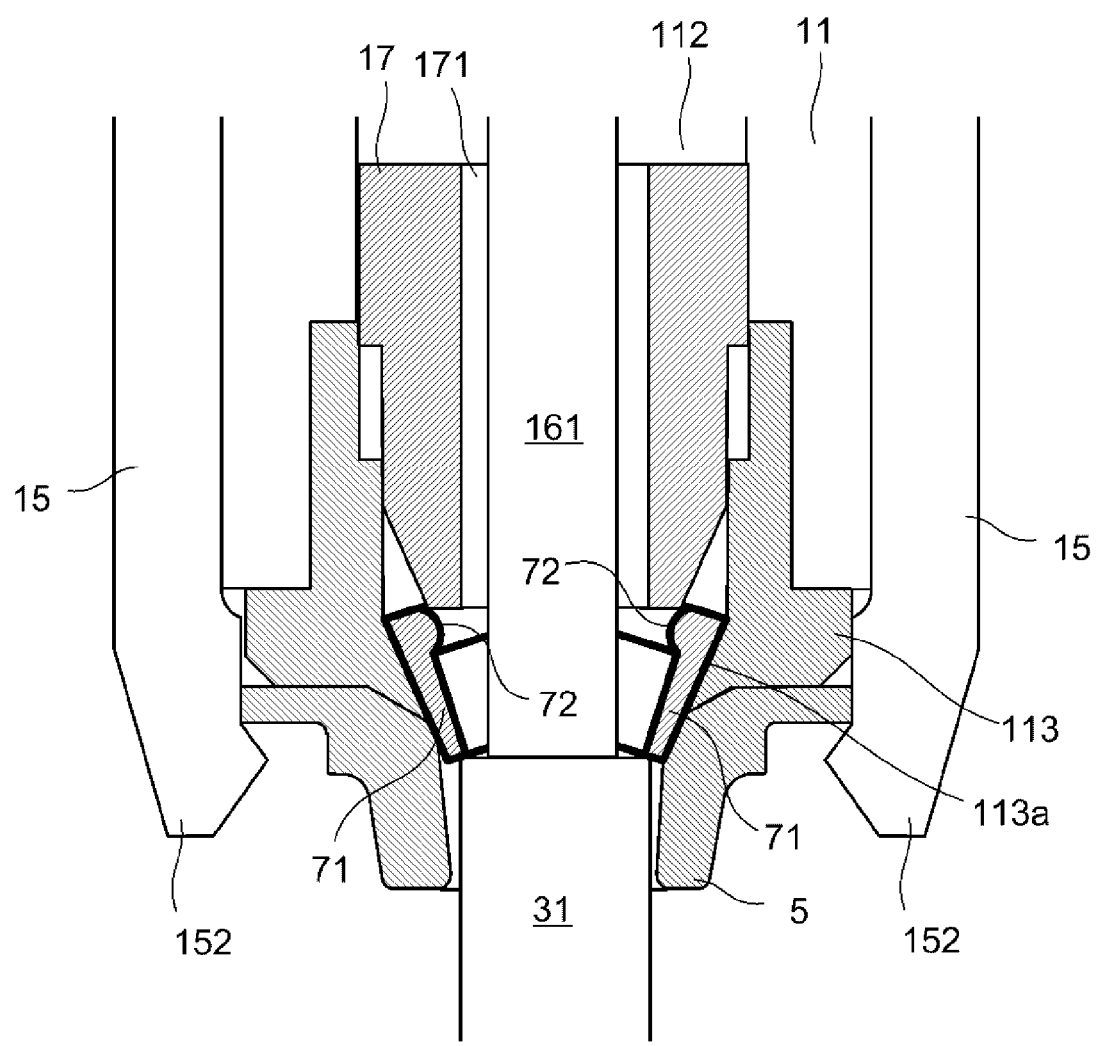
FIG. 5 is an explanatory view of cotter segments in a separated state.

In a process in which the cotter 7 is pushed up into the guide member 113, the pair of cotter segments 71 are separated and opened (tilted) outwardly. During this outward opening process, since the cotter segments 71 are guided by the tapered surface of the tapered inner circumferential portion 113b, their tilt angles become equal to a slope angle of the tapered surface, and are always constant. Then, the cotter 7 enters into the guide member 113 in a separated state in which the upper portions of the cotter segments 71 are largely separated compared to their lower portions (FIG. 5).

At this time, the contact member 17 always contacts upper portions of the cotter segments 71. That is, the contact member 17 contacts inner edge portions of the pair of cotter segments 71 from a position above the cotter segments 71, so that it breaks in between the pair of cotter segments 71 as the cotter segments 71 are separated and opened outwardly. Thus, the contact member 17 always acts to bear down the cotter segments 71 and to open up the cotter segments 71 toward the tapered inner circumferential portion 113b. With this mechanism, the pair of cotter segments 71 can be guided by the tapered inner circumferential portion 113b more reliably, thus surely guiding the pair of cotter segments 71 to the separated state.

Figure 4:
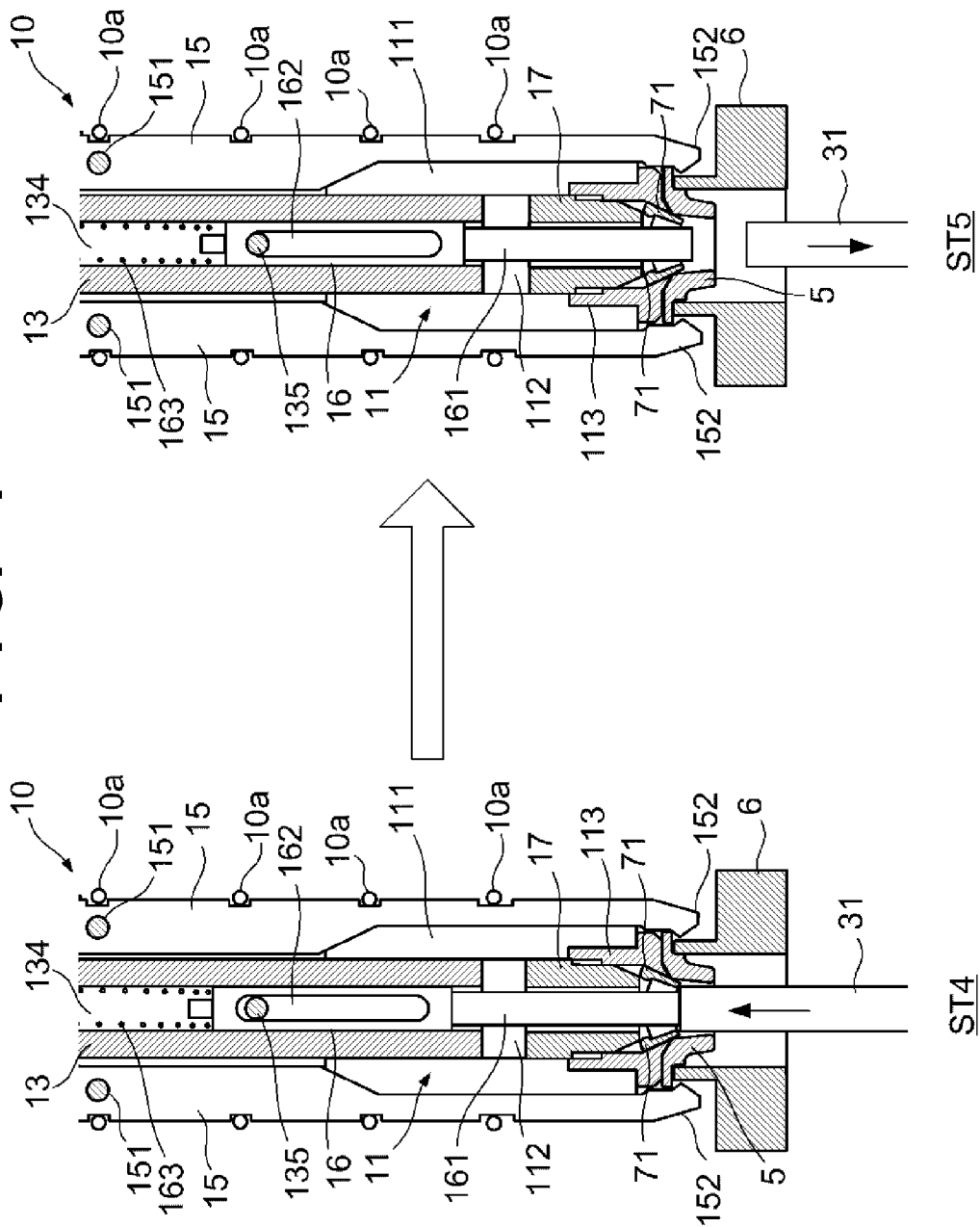
FIG. 4 includes operation explanatory views of the retainer assembling apparatus.

When the pair of cotter segments 71 are pushed up into the guide member 113 in the separated state, the push-up shaft 31 is moved downward upon operation of the lifting unit 30 (state ST5 in FIG. 4). As the push-up shaft 31 is moved downward, the axial body 16 which contacts the push-up shaft 31 is moved downward, and the axial portion 161 enters between the pair of cotter segments 71, as shown in the state ST5 in FIG. 4 (separation maintaining process).

At this time, the contact member 17 contacts the inner edge portions of the pair of cotter segments 71 by its own weight from a position above the cotter segments 71 to break in between the pair of cotter segments 71, and this contact state is continued to apply a force for further opening the pair of cotter segments 71. On the other hand, when the lower ends of the pair of cotter segments 71 contact the axial portion 161, a further opening action of the cotter segments 71 is suppressed. In this manner, even after the push-up shaft 31 is retracted, the separated state of the pair of cotter segments 71 can be maintained. Note that in this embodiment, the push-up shaft 31 is moved up and down. Alternatively, the push-up shaft 31 may be fixed, and the holding unit 10 may be moved up and down to cause the push-up shaft 31 to enter or retract.

Next, the control shifts to the mounting process of the retainer 5 to the valve stem 1a. Initially, the holding unit 10 is moved upward by the lifting unit 50, and is then moved by the moving unit 51 to the position (the one-dashed chain line position in FIG. 1) above the valve stem 1a, as shown in FIG. 1.

Figure 6:
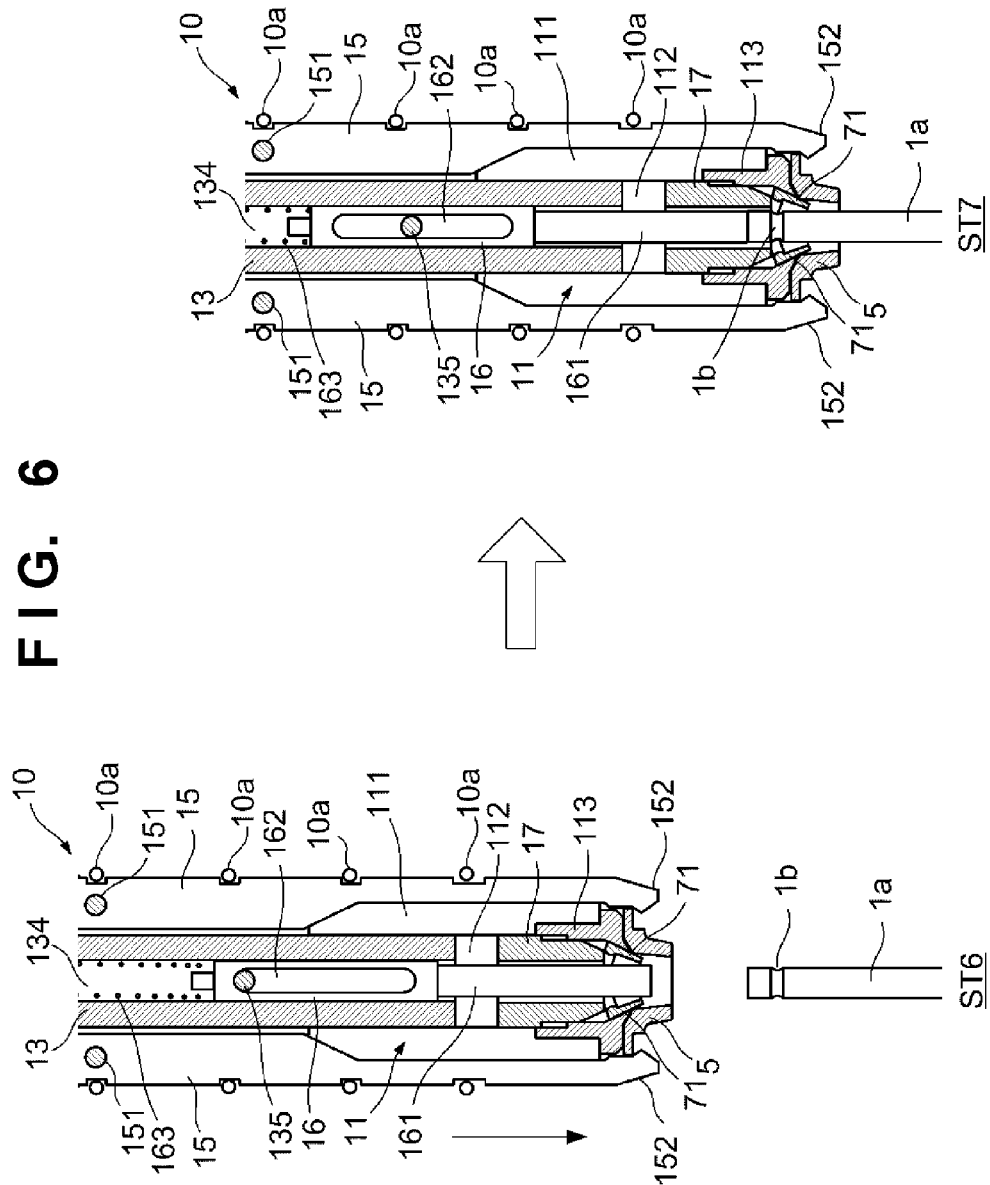
FIG. 6 includes operation explanatory views of the retainer assembling apparatus.
Figure 7:
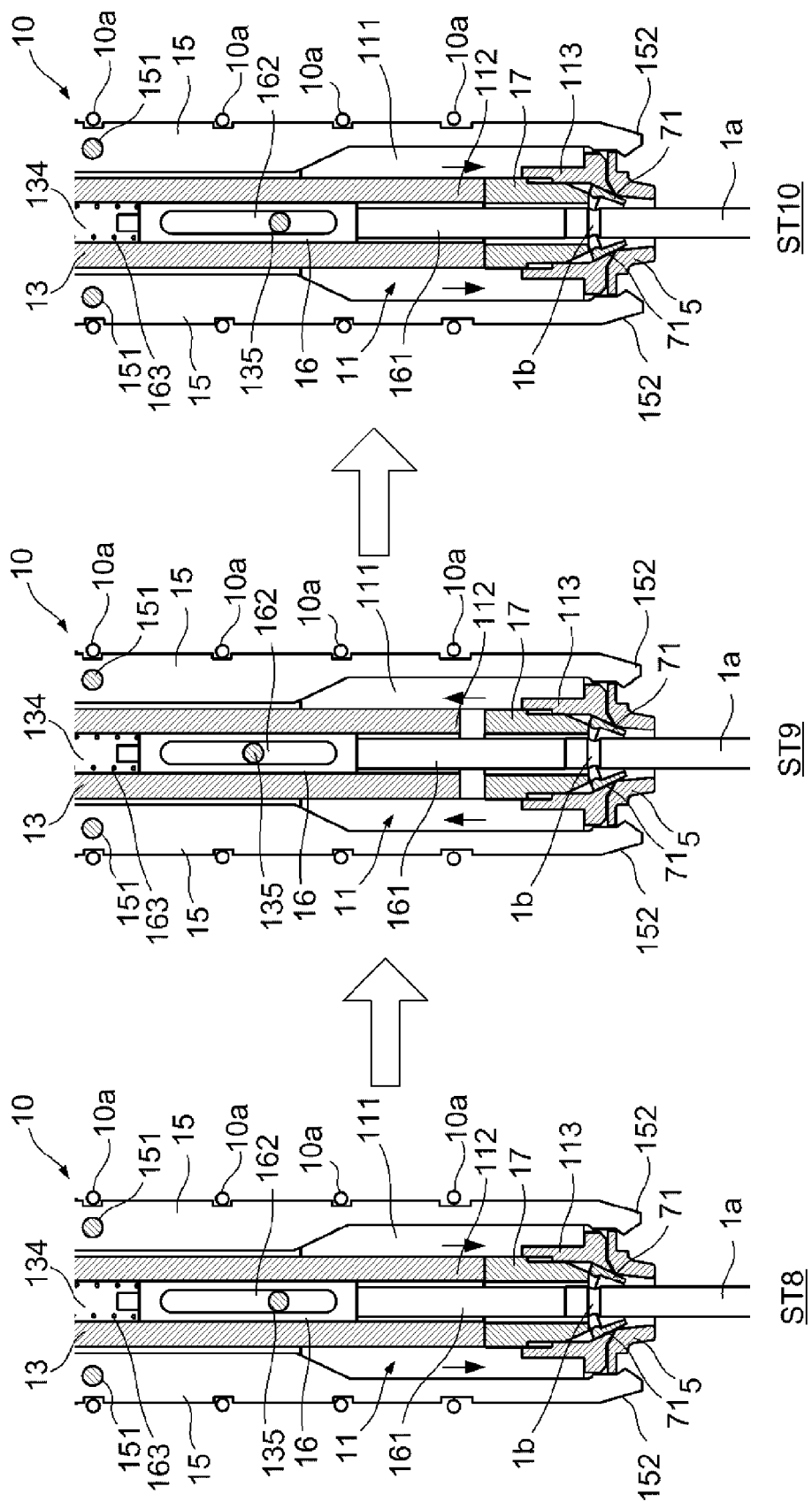
FIG. 7 includes operation explanatory views of the retainer assembling apparatus.

A state ST6 in FIG. 6 illustrates the positional relationship between the holding unit 10 and valve stem 1a at this time. The valve stem 1a, retainer 5, axial body 16, tapping member 13, through hole 112, and the like are positioned to be coaxial with each other (on the axis in the vertical direction).

Next, the holding unit 10 is moved downward upon operation of the lifting unit 50 to cause the upper end of the valve stem 1a to enter into the cylindrical body 11 from its lower end (entrance process). Since the axial portion 161 contacts the valve stem 1a, the axial body 16 is also pushed up (state ST7 in FIG. 6). When the valve stem 1a enters, since the pair of cotter segments 71 are maintained in the separated state, the valve stem 1a can be avoided from biting the cotter segment 71. Especially, in this embodiment, since upper portions of the pair of cotter segments 71 in the separated state are largely separated compared to their lower portions, the engaging portions 72 of the pair of cotter segments 71 are largely separated from each other, thus preventing the valve stem 1a from biting the cotter segment 71 more reliably.

After that, when the holding unit 10 is moved upward, assembling of the retainer 5 to the valve stem 1a is completed. In this case, in order to surely avoid the cotter segment 71 from being bit between the valve stem 1a and the inner circumferential surface of the retainer 5, the contact member 17 taps the upper portions of the pair of cotter segments 71 to adjust their postures, so that the postures of the pair of cotter segments 71 are reliably set in the separated state (adjustment process).

Biting of the cotter segment 71 is often caused by, for example, decentering between the valve stem 1a and retainer 5. Due to such decentering, since gaps between the inner wall of the through hole of the retainer 5 and the circumferential surface of the valve stem 1a vary depending on portions, one of the pair of cotter segments 71 readily enters into the retainer 5, and the other hardly enters. As a result, biting of the cotter segment 71 is caused.

In this adjustment process, the driving unit 20 is operated to move the plunger 21 downward. Then, the tapping member 13 is moved downward to tap the contact member 17 downward, as shown in a state ST8 in FIG. 7. As a result, the contact member 17 taps (pushes downward) the upper portions of the pair of cotter segments 71. Since the contact member 17 contacts the inner edge portions of the pair of cotter segments 71 from a position above the cotter segments 71, a force for breaking in between the pair of cotter segments 71 is applied to the pair of cotter segments 71.

In this embodiment, this tapping is successively performed a plurality of times. For this purpose, the driving unit 20 is operated to move the plunger 21 upward, thereby moving the tapping member 13 upward (state ST9 in FIG. 7), and moving the plunger 21 downward again. Then, the tapping member 13 is moved downward, and the contact member 17 is tapped downward by the tapping member 13 (state ST10 in FIG. 7). As a result, the postures of the pair of cotter segments 71 can be reliably set in the separated state. Therefore, the relative positional relationship between the cotter segments 71 and the valve stem 1a can always be kept in a constant state (normal state).

In the above adjustment process, it is preferable to alternately perform tapping of the cotter segments 71 by the contact member 17, and upward/downward movements of the entire holding unit 10 by the lifting member 50. Thus, biting of the cotter segment 71 can be further reliably prevented. In this case, the upward/downward movement stroke of the entire holding unit 10 can be extremely small. For example, the stroke can be about a half of the length of the through hole of the retainer 5. The number of times of alternate operations may be one set or a plurality of sets. Furthermore, the number of taps and number of upward/downward movements per set may be one or a plurality of times.

Figure 8:
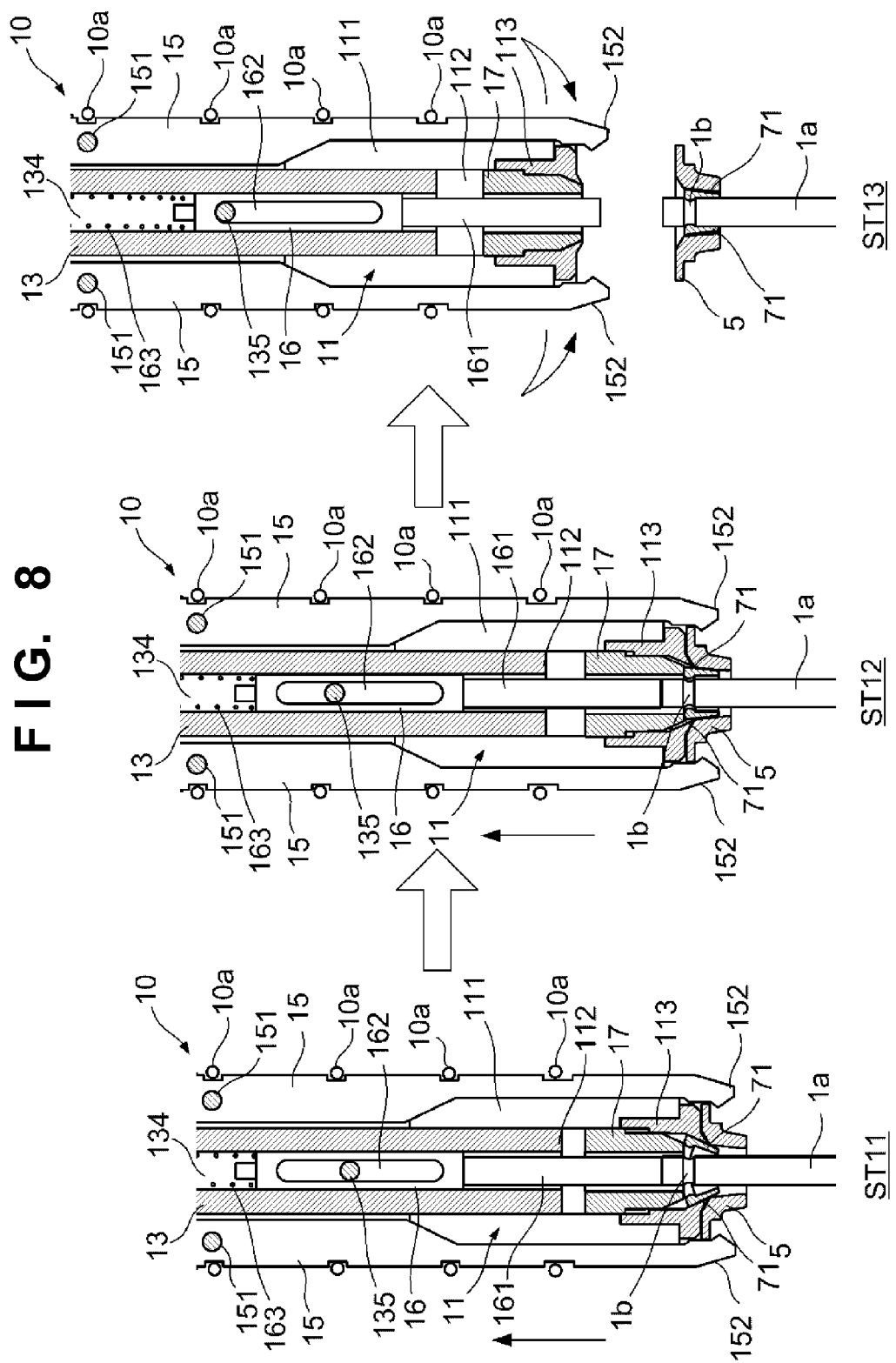
FIG. 8 includes operation explanatory views of the retainer assembling apparatus.

By moving the holding unit 10 upward by the lifting unit 50, assembling of the retainer 5 to the valve stem 1a is completed. A state ST11 in FIG. 8 shows a state at the beginning of the upward movement, a state ST12 shows a halfway state, and a state ST13 shows the assembling completed state. As the holding unit 10 is moved upward, the valve stem 1a is gradually withdrawn from the cylindrical body 11. At this time, the pair of cotter segments 71 begin to be gradually closed while being guided by the inner circumferential surface of the retainer 5, and are then completely closed when the engaging portions 72 engage with the engaging groove 1b of the valve stem 1a. Thus, the valve stem 1a and retainer 5 engage with each other via the cotter 7. When the holding unit 10 is moved further upward, the flange portion of the retainer 5 pushes the holding portions 152 outwardly to pivot the holding members 15 in an opening direction against the biasing force of the elastic members 10a, thus releasing the holding state. Note that in this embodiment, the holding unit 10 is moved. Alternatively, the valve stem 1a side may be moved.

As described above, according to this embodiment, when the cotter 7 is pushed up into the cylindrical body 11, since the guide member 113 having the tapered inner circumferential portion 113b is arranged, the pair of cotter segments 71 can be accurately guided to the separated state. As a result, the postures of the cotter segments 71 can be stable, and any engagement failure between the valve stem 1a and retainer 5 can be prevented. In this embodiment, as members for stabilizing the postures of the cotter segments 71, the guide member 113 having the tapered inner circumferential portion 113b and the contact member 17 are used, and the postures of the cotter segments 71 can be stabilized by a simpler arrangement than the conventional apparatus.

Furthermore, since the contact member 17 is arranged, it can surely guide the pair of cotter segments 71 to the separated state, and can maintain that state. Furthermore, by tapping by the tapping member 13, the pair of cotter segments 71 can be further surely guided to the separated state.

Note that in this embodiment, the postures of the cotter segments 71 are stabilized by both of guiding of the pair of cotter segments 71 to the separated state by the guide member 113 and tapping of the pair of cotter segments 71 by the tapping member 13, thereby preventing any engagement failure with the valve stem 1a. Either one of these operations may be adopted. Even in this case, a given effect can be expected to prevent any engagement failure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-108702 filed May 13, 2011, which is hereby incorporated by reference herein in its entirety.

What is claimed is:

1. A retainer assembling apparatus which assembles a retainer to a valve stem via a cotter which engages with an engaging groove formed on the valve stem, the cotter comprising a pair of cotter segments, said apparatus comprising:
   a cylindrical body including a first hole allowing the valve stem to enter;
   a guide member which forms a lower end of said cylindrical body and includes a second hole through the guide member, the retainer attached with the cotter being brought into contact with the guide member, the second hole being coaxial with the first hole;
   a holding portion which holds the retainer contacting said guide member;
   a push-up shaft which enters from a lower end of the retainer held by said holding portion and pushes up the pair of cotter segments into said guide member;
   an axial body which is arranged in said cylindrical body to be coaxial with said push-up shaft and to be coaxially movable; and
   a cylindrical contact member which is mounted around said axial body and is arranged in said guide member to be freely movable in an axial direction of said axial body,
   wherein said second hole includes a tapered inner circumferential portion which is formed into a tapered shape, a diameter of which is increased upward, on an inner circumferential wall lower portion thereof,
   wherein said cylindrical contact member includes a tapered outer shape portion, a diameter of which is decreased downward to fit the tapered inner circumferential portion of said second hole, on a lower portion thereof,
   wherein the pair of cotter segments pushed up into the guide member are separated and opened outwardly with being guided by the tapered inner circumferential portion of said second hole,
   wherein said tapered outer shape portion of said cylindrical contact member acts to bear down the cotter segments pushed up into the guide member so as to open up the cotter segments toward the tapered inner circumferential portion of said second hole, and
   wherein said guide member includes a flange portion protruding in a radial direction, and said flange portion includes a slit in which said holding portion is inserted.

2. The apparatus according to claim 1, further comprising:
   a cylindrical tapping member which includes an insertion hole through which said axial body is inserted, and is arranged in said cylindrical body to be movable in the axial direction of said axial body; and
   a driving unit which moves said tapping member to tap said contact member downward in the axial direction of said axial body.

3. The apparatus according to claim 2, wherein the insertion hole of said tapping member has a closed upper end, and an elastic member which biases said axial body downward in the axial direction of said axial body is arranged between a cover portion of the insertion hole and said axial body.

4. The apparatus according to claim 1, further comprising:
   a first lifting unit which moves said cylindrical body up and down with respect to the valve stem;
   a second lifting unit which moves said push-up shaft up and down; and
   a moving unit which moves said cylindrical body between a position above the valve stem and a position above said push-up shaft.

* * * * *